No. 880,979. PATENTED MAR. 3, 1908.
T. A. EDISON.
METHOD OF MAKING STORAGE BATTERY ELECTRODES.
APPLICATION FILED NOV. 2, 1905.
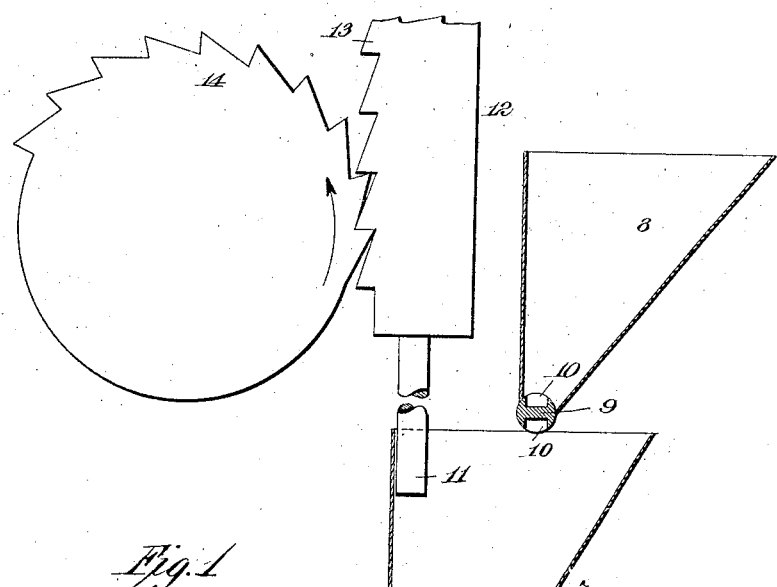
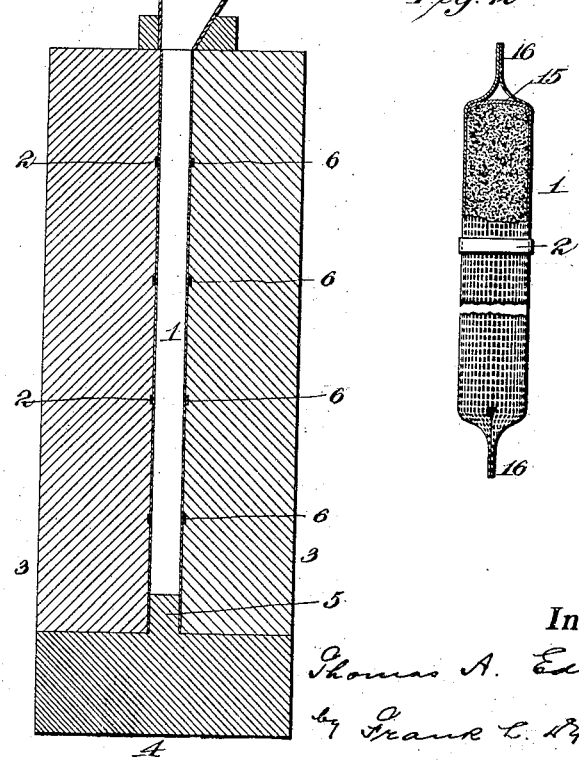
Witnesses:
Inventor
Thomas A. Edison
by Frank L. Dyer
Attorney

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

METHOD OF MAKING STORAGE-BATTERY ELECTRODES.

No. 880,979.  Specification of Letters Patent.  Patented March 3, 1908.

Application filed November 2, 1905. Serial No. 285,651.

To all whom it may concern:

Be it known that I, THOMAS ALVA EDISON, a citizen of the United States, residing at Llewellyn Park, Orange, in the county of Essex and State of New Jersey, have invented a certain new and useful Method of Making Storage-Battery Electrodes, of which the following is a description.

My invention relates to an improved method of making electrode elements for storage batteries of the Edison type.

In an application filed on even date herewith I describe the improved electrode element, constructed in accordance with my present method, and have quite elaborately explained the correct condition which should exist in the active material to secure the best results. Assuming the invention to be carried out in connection with the manufacture of the nickel mass and that metallic flakes of cobalt or cobalt-nickel alloy are used therewith, then, the best results are secured in practice when the conducting films or flakes, overlying and lapping upon one another, constitute a close net-work of metallic conductors, extending in all directions throughout the mass, the active particles being closely compacted in engagement with the conductors so as to make good contact therewith, and proper circulation throughout the mass being afforded by providing the mass with a net-work of circulating channels extending in all directions and presenting a substantially predetermined proportion of porosity relatively to the entire mass. As I point out in my said application, these peculiar characteristics are secured when the electrode mass is subjected to special treatment before its introduction within the containing tubes, during its introduction therein, and subsequent to such introduction, and this special treatment comprises my present method and will be claimed herein. Broadly stated, my improved method comprises:

First: Covering the particles of active material, such as nickel hydroxid, with the conducting films, flakes or scales, preferably cobalt or cobalt-nickel alloy, by a process like that disclosed in my application filed March 30th, 1905, Serial No. 252,931, wherein the particles of active material are first coated with a very sticky substance like glucose, after which the conducting flakes or scales are added and intimately mixed therewith, so as to adhere with sufficient tenacity to the active particles as to prevent segregation during manufacture. This special treatment presents important advantages in connection with the present invention, as will be explained.

Second: The mass obtained in this way is now introduced within perforated non-deformable inclosing pockets of sufficient strength to resist the bulging or disrupting strains encountered in actual use, and due to the tendency of the active material to expand by absorption of the electrolyte, by electrolytic action, and by the pressure of gas generated within the mass. In thus filling the pockets with the mixture of active material and conducting flakes, I introduce the mixture within the pockets in relatively small increments (from fifty to a hundred increments for eight grams of the mixture) and I subject each increment to one or more tamping pressures, preferably as much as 20,000 pounds per square inch, each pressure being substantially uniform, so that the mass throughout will be uniformly highly compressed. As a result of this operation, the active particles will be crushed and deformed, so as to penetrate the films of sticky material, greatly extend the area of contact with the conducting flakes and prevent the smaller particles from being isolated or from making imperfect or superficial contact with the conducting flakes, and the conducting flakes will be pressed together to overlap and form a net-work of conducting paths extending in all directions throughout the mass. The mass, as a whole, will furthermore be so closely and tightly consolidated as to prevent relative movement of the active particles with respect to the conducting flakes, and relative movement of the conducting flakes with respect to each other, as I have discovered that if such relative movement takes place the contact condition of the mass will be seriously impaired.

Third: After the mass has been thus packed in increments under high pressure within the perforated non-deformable inclosing pockets, and the latter have been compressed at their ends upon small cups or diaphragms engaging the extremities of the mass, the sticky material or binder is removed from the mass by dissolving it out, preferably in slightly alkaline water to prevent rust. This removal of the binder results in the formation within the mass of a net-work of circulating channels which are important in permitting the electrolyte to readily penetrate the mass and circulate through the same, thereby allowing a large amount of the electrolyte to rapidly reach all parts of the mass to accommodate high discharge rates. These circulating channels also permit the mass to deform internally under swelling pressures, which, if the mass were perfectly consolidated, might burst the containing pockets. By forming a net-work of circulating channels in the active mass, as explained, I am enabled to very perfectly regulate the relative proportion of porosity, merely by regulating the amount of sticky material admixed with the active particles in the first instance.

In order that the invention may be better understood, attention is directed to the accompanying drawings, forming part of this specification, and in which—

Figure 1, is a sectional diagrammatic view of a suitable apparatus for filling and tamping the active mass within the non-deformable containing pockets, and Fig. 2, a front elevation partly in section of one of the complete electrode elements. In both of these views corresponding parts are represented by the same numerals of reference.

The pockets 1 are preferably tubular, formed of a perforated strip of steel about .004 of an inch in thickness, first carefully plated with an alloy of cobalt and nickel, after which the strips are subjected to a welding temperature in a hydrogen atmosphere, being then formed into tubes. The tubes in question are preferably about four inches long, and about one-quarter of an inch in internal diameter. Surrounding the tube is a number of seamless nickel rings 2, fitting the tube snugly, and adding very materially to the strength of the tube in resisting bursting strains. The filling of these tubes is preferably performed in a suitable apparatus of the general type disclosed in my application, filed October 14th, 1905, Serial No. 282,692, and shown diagrammatically in Fig. 1. One or more of the tubes are placed in a suitable sectional holder 3—3, the sections of which are tightly clamped together and closely engage the tubes, so as to resist the enormous bursting strains encountered during the filling operation. The holder also comprises a base 4, for receiving the sections 3, and provided with an extension 5, extending within the tubes and defining the extent of the tube which is to be turned over upon the compressed material, as will be understood. The sections 3 are provided with recesses 6 for receiving the strengthening rings 2. During the tamping of the material within the tubes, the latter will expand slightly into very close and intimate contact with the strengthening rings, preventing any liability of shifting of the latter. It will be understood that the sectional holder is provided with a series of chambers into which a number of the tubes will be snugly received, so that a plurality of tubes may be simultaneously filled. Leading to each of the tubes is an auxiliary hopper 7, for guiding the successive increments of material therein. These increments are supplied from a main hopper 8, the bottom of which comprises a rotating shaft 9, having pockets 10—10 therein, the size of the latter depending upon the bulk of each increment. Coöperating with each tube, is a tamping plunger 11, formed with a weight 12, of suitable mass and provided with a rack 13, with which engages a toothed cylinder 14. The cylinder 14 is so coördinated with the rotary shaft 9 as to give one or two tamping operations on each increment. There is a substantially greater number of teeth on the rack 13 than on the cylinder 14. As the cylinder 14 rotates the teeth on its periphery engage the rack 13, so as to lift the plunger 11 to an extent depending upon the number of teeth on the cylinder, and when the last tooth on the cylinder leaves the rack 13, the plunger will drop. The rack 13 is of sufficient length to permit the teeth of the cylinder 14 to give at all times a complete lifting movement to the plunger, so that it will be understood that whether the plunger is engaging an increment near the bottom of the tube or an increment when the tube is wholly filled, the first tooth of the cylinder will engage some one tooth on the rack, will then lift the rack through a distance corresponding to the number of the teeth on the cylinder, when the plunger will drop. As the tube is filled up the cylinder teeth will engage with rack teeth which are lower and lower upon the rack, but the rack will always be lifted up until each of the teeth of the cylinder has engaged one of the teeth on the rack and therefore the plunger will always drop the same distance and therefore impart the same tamping blow.

In practice I permit the plungers weighing three pounds each to drop a distance of five inches; and the diameter of the plungers is about one-quarter of an inch. In this way I deliver a tamping blow of about one thousand pounds on each increment, since the plungers are brought almost instantaneously to rest. At the same time, by imparting a very great pressure in only a fraction of a second, the plungers although of small diameter, have no opportunity of becoming distorted, or breaking, as would be the case if the same pressure were applied gradually, as in a hydraulic press. Usually provision is made, as disclosed in my said application last referred to, for arresting the operation of the feeding and tamping mechanism when a predetermined number of increments have been introduced within the tubes. In practicing my method in conjunction with an apparatus, having the characteristics described, I proceed substantially as follows: The active material, such as particles or granules of nickel hydroxid, which have been first screened, for instance, through a thirty-mesh screen, so as not to secure too great a variation in the size thereof, are first coated with a very sticky material such as molasses or glucose, preferably the latter, the degree of viscosity of the sticky material being very great. I now intimately mix with the sticky mass, a suitable proportion of conducting flakes or scales, preferably flakes of metallic cobalt or cobalt-nickel alloy, and continue the mixing until the conducting flakes have effectively covered the surfaces of the active particles. The best proportion of the mixture for introduction into the tubes is 60 per cent. by weight of crushed nickel hydroxid, screened through a thirty-mesh screen, 20 per cent. of flake cobalt or flake cobalt-nickel alloy, and 20 per cent. of a very viscous glucose, sufficiently sticky to fasten the flakes to the nickel granules and prevent their detachment during manufacture. Ordinarily about eight grams of the mixture will be introduced within the tubular pockets of the dimensions stated, the mixture being introduced in relatively small increments, determined by the size of the pockets 10. Where a single tamping operation is performed on each increment, I find that the best results are secured when about one-hundred increments of the active mass are successively introduced within each tube, but where each increment is tamped twice, fifty increments may be successively introduced, the latter substantially being preferable. By applying an enormous tamping pressure on successive small increments, the mass will not only be closely packed within the tubes, but the larger active particles will be broken down and deformed, so as to close up the interstices between the same, (so far as will be permitted by the presence of the sticky material) thereby consolidating the mass as a whole, and bringing all the active particles in good contact with the conducting paths formed by the conducting scales or flakes. At the same time, the pressure forces the active particles through the films of sticky material into contact with the conducting flakes and thereby displaces the sticky material, which accumulates in the many minute interstices presented between the particles of the active mass. The viscosity of the sticky material prevents it from being squeezed out of the active mass and from entering the pores of the active particles. As thus formed, the mass presents a very compact composite body under great pressure, and containing minute connected bodies of the sticky material as displaced by the pressure. Obviously, as a result of the tamping pressure, the mass will also be forced into intimate contact with the conducting walls of the tubular pockets, so as to secure good electrical contact with the same. I find that the consolidation of the mass is materially facilitated by the presence of the glucose or other sticky material, which apparently has a lubricating effect, permitting the particles under the tamping pressure to more readily shift into their ultimate positions, and also, allowing the individual particles to be more readily compacted or deformed. As a matter of fact, and notwithstanding the added bulk of the sticky material, I have observed that it is possible to tamp a greater mass of active material into a tube than can be done under the same pressure when the sticky material is not used.

After the proper amount of active material has been introduced and tamped within the tubular pockets, any excess thereof is removed at the upper end by reaming, and a nickel cup or diaphragm 15, having sharpened turned over edges, is forced in upon the active mass at each end and tightly compressed upon the same, as shown. The ends of the tubes are now turned over at 16 to engage the end cups 15, holding the active mass firmly against longitudinal expansion within the tubes. The sticky material or binder is now removed either before or after the electrode elements have been assembled in a suitable grid, and this removal is effected by soaking the tubes in water, slightly alkaline, so as to dissolve it out. This results in the formation of a net-work of minute connected channels, crevices and pockets, which are important in permitting the free escape for gas, and at the same time allowing a rapid circulation of the electrolyte to accommodate discharges at an exceedingly high rate. The open spaces within the mass which are thus formed, may occupy 25 per cent. or more of the entire mass. The use of a sticky material is, therefore, important for a two-fold purpose (i. e. to cause the conducting flakes to adhere to the active particles and to result in the formation of circulating channels) and if none were used—or an insufficient amount were used—the mass would be too non-porous to permit a sufficiently rapid circulation of the electrolyte to accommodate desired high discharge rates. On the other hand, care must be exercised not to use too much of the sticky material as to honey-comb the mass to too great an extent, as thereby the mass would be weak structurally and there would be liability of the active particles and conducting flakes moving relatively to impair the contact condition of the mass as a whole. After the sticky material has been removed the active mass constitutes a porous coherent body about as hard as soap-stone and cutting with about the same facility. It is, in fact, so hard that it may be polished without crumbling. Under the microscope, the overlapped conducting flakes appear as a delicate tracery of vein-like conductors, extending in all directions throughout the mass, and forming a conducting net-work with which the active particles are in close contact. In use, the absorption of the electrolyte by capillarity and also electrolytic changes, effect a swelling of the active particles, but any deformation is permitted internally by reason of the presence of the net-work of circulating channels, and the pressure on the walls of the container is insufficient to disrupt the same. This swelling is not sufficient to close up the circulating channels and does not, therefore, interfere with the perfect and rapid circulation of the electrolyte, nor with the escape of gas. As a matter of fact, the particles of nickel hydroxid are themselves quite porous, but not to a sufficient extent, if alone relied upon, to permit the electrolyte to circulate with sufficient rapidity throughout the mass; but by providing the mass with connected passages extending throughout the same, the electrolyte is enabled to readily and rapidly penetrate the mass in all directions, so that the porosity of each particle has only to be relied upon to furnish the necessary supply of the solution to its own minute mass.

Having now described my invention, what I claim as new therein and desire to secure by Letters Patent is as follows:

1. The method of making electrode elements which consists in introducing a mixture of particles of active material and flake-like conducting material within non-deformable inclosing pockets, and in applying a pressure to such material sufficient to crush or deform the active particles and cause them to substantially follow the contour of the conducting flakes, as and for the purposes set forth.

2. The method of making electrode elements, which consists in introducing within a non-deformable inclosing pocket in successive small increments, a mixture of particles of active material and flake-like conducting material, and in applying to each increment after its introduction sufficient pressure to deform or crush the active particles and cause them to substantially follow the contour of the conducting flakes, as and for the purposes set forth.

3. The method of making electrode elements, which includes adding a sticky binder to the active particles, so as to substantially coat the surfaces of the latter, in then adding to the sticky mass flake-like conducting material, whereby the conducting flakes will be caused to adhere to the active particles, in introducing the mixture so obtained within non-deformable inclosing pockets, and in applying to the mixture sufficient pressure to force the active particles through the films formed by the binder, displacing the latter into the minute interstices formed within the mass and spreading the active particles with respect to and upon the surfaces presented by the conducting flakes, as and for the purposes set forth.

4. The method of making electrode elements, which includes adding a sticky binder to the active particles, so as to substantially coat the surfaces of the latter, in then adding to the sticky mass flake-like conducting material, whereby the conducting flakes will be caused to adhere to the active particles, in introducing the mixture so obtained in successive small increments within non-deformable inclosing pockets, and in applying to each increment sufficient pressure to force the active particles through the films formed by the binder, displacing the latter into the minute interstices formed within the mass and spreading the active particles with respect to and upon the surfaces by the conducting flakes, as and for the purposes set forth.

5. The method of making electrode elements, which consists in adding a sticky binder to the active particles, so as to substantially coat the surfaces of the latter, in then adding to the sticky mass flake-like conducting material, whereby the conducting flakes will be caused to adhere to the active particles, in introducing the mixture so obtained within non-deformable inclosing pockets, and in applying to the mixture sufficient pressure to force the active particles through the films formed by the binder, displacing the latter into the minute interstices formed within the mass, and spreading the active particles with respect to and upon the surfaces presented by the conducting flakes, and in finally removing the binder so as to thereby result in the formation within the mass of a net-work of circulating channels, as and for the purposes set forth.

6. The method of making electrode elements, which consists in adding a sticky binder to the active particles, so as to substantially coat the surfaces of the latter, in then adding to the sticky mass, flake-like conducting material, whereby the conducting flakes will be caused to adhere to the active particles, in introducing the mixture so obtained in successive small increments within non-deformable inclosing pockets and in applying to each increment sufficient pressure to force the active particles through the films formed by the binder, displacing the latter into the minute interstices formed within the mass and spreading the active particles with respect to and upon the surfaces by the conducting flakes, and in finally removing the binder so as to thereby result in the formation within the mass of a net-work of circulating channels, as and for the purposes set forth.

7. The method of determining the porosity to be present in the active mass of a storage battery electrode, which consists in adding to the active particles a predetermined amount of a soluble viscous material, then in adding a flake-like conducting material thereto, then in introducing the mixture within a suitable inclosing pocket, then in applying pressure to the mass, and finally, in removing the viscous material, whereby the spaces previously occupied by the same will exist as a net-work of circulating channels extending in all directions throughout the mass, as and for the purposes set forth.

8. The method of making storage battery electrodes, which consists in introducing in successive and very small increments, active material within a non-deformable inclosing pocket, and in subjecting each increment to one or more tamping blows delivered by a weight falling always from the same height above each increment, as and for the purposes set forth.

This specification signed and witnessed this 31st day of October 1905.

THOMAS A. EDISON.

Witnesses:
FRANK L. DYER,
ANNA R. KLEHM.